United States Patent
Chae et al.

(10) Patent No.: US 10,080,199 B2
(45) Date of Patent: Sep. 18, 2018

(54) METHOD AND DEVICE FOR ACQUIRING CONTROL INFORMATION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/900,518

(22) PCT Filed: Jul. 7, 2014

(86) PCT No.: PCT/KR2014/006047
§ 371 (c)(1),
(2) Date: Dec. 21, 2015

(87) PCT Pub. No.: WO2015/002516
PCT Pub. Date: Jan. 8, 2015

(65) Prior Publication Data
US 2016/0157185 A1 Jun. 2, 2016

Related U.S. Application Data

(60) Provisional application No. 61/843,063, filed on Jul. 5, 2013, provisional application No. 61/986,090, filed on Apr. 29, 2014.

(51) Int. Cl.
*H04W 52/22* (2009.01)
*H04W 76/14* (2018.01)
(Continued)

(52) U.S. Cl.
CPC ......... *H04W 52/228* (2013.01); *H04W 52/16* (2013.01); *H04W 52/30* (2013.01);
(Continued)

(58) Field of Classification Search
None
See application file for complete search history.

(56) References Cited

U.S. PATENT DOCUMENTS

2010/0272091 A1* 10/2010 Fabien ............... H04W 48/08
370/345
2011/0081936 A1 4/2011 Haim et al.
(Continued)

FOREIGN PATENT DOCUMENTS

| CN | 101808360 | 8/2010 |
| CN | 102045825 | 5/2011 |

(Continued)

OTHER PUBLICATIONS

European Patent Office Application Serial No. 14819471.5, Search Report dated Dec. 12, 2016, 10 pages.
(Continued)

*Primary Examiner* — Faruk Hamza
*Assistant Examiner* — Cassandra Decker
(74) *Attorney, Agent, or Firm* — Lee, Hong, Degerman, Kang & Waimey

(57) ABSTRACT

A signal transmission method is a method by which a secondary node transmits a signal in a wireless communication system comprising the steps of: receiving a scheduling map from either a scheduling node or a master node; performing scheduling and/or transmission power control on the basis of the scheduling map; and transmitting a signal on the basis of the scheduling or transmission power control result, wherein when the secondary node respectively transmits control information and data in a discontinuous fre- (Continued)

quency domain, the transmission power control includes adjustment for each of the maximum transmission power of the control information and the maximum transmission power of the data.

10 Claims, 11 Drawing Sheets

(51) Int. Cl.
*H04W 52/38* (2009.01)
*H04W 52/16* (2009.01)
*H04W 72/12* (2009.01)
*H04W 52/30* (2009.01)
*H04L 5/00* (2006.01)
*H04W 92/18* (2009.01)

(52) U.S. Cl.
CPC ..... *H04W 52/383* (2013.01); *H04W 72/1278* (2013.01); *H04W 76/14* (2018.02); *H04L 5/001* (2013.01); *H04L 5/0094* (2013.01); *H04W 72/1289* (2013.01); *H04W 92/18* (2013.01)

(56) References Cited

U.S. PATENT DOCUMENTS

| | | | |
|---|---|---|---|
| 2011/0268004 A1* | 11/2011 | Doppler | H04W 72/02 370/311 |
| 2012/0028672 A1 | 2/2012 | Chen et al. | |
| 2012/0135778 A1* | 5/2012 | Tian | H04L 1/0003 455/522 |
| 2013/0114505 A1* | 5/2013 | Haim | H04W 52/146 370/328 |
| 2014/0243040 A1* | 8/2014 | Bienas | H04W 36/30 455/552.1 |
| 2014/0247802 A1* | 9/2014 | Wijting | H04W 76/023 370/329 |
| 2015/0139092 A1* | 5/2015 | Guo | H04L 5/001 370/329 |

FOREIGN PATENT DOCUMENTS

| | | |
|---|---|---|
| EP | 1928114 | 6/2008 |
| KR | 10-2006-0090065 | 8/2006 |
| KR | 10-2011-0101086 | 9/2011 |
| WO | 2012090327 | 7/2012 |
| WO | 2012166969 | 12/2012 |

OTHER PUBLICATIONS

Qualcomm Incorporated, "LTE-A UL power control", R4-102401, TSG-RAN WG4 AH#3, Jun. 23, 2010, 4 pages.
Agilent Technologies, "LTE-RF: CR for MPR 1, 5,014 test case", R5-095660, TSG-RAN WG5 Meeting #45, Oct. 26, 2009, 6 pages.
PCT International Application No. PCT/KR2014/006047, Written Opinion of the International Searching Authority dated Sep. 25, 2014, 15 pages.
European Patent Office Application Serial No. 14819471.5, Office Action dated Feb. 9, 2018, 8 pages.
State Intellectual Property Office of the People's Republic of China Application Serial No. 201480038527.1, Office Action dated Mar. 30, 2018, 22 pages.
Motorola, "Uplink Power Control for LTE-A", 3GPP TSG RAN WG1 Meeting #59bis, R1-100178, Jan. 2010, 4 pages.

* cited by examiner

FIG. 1
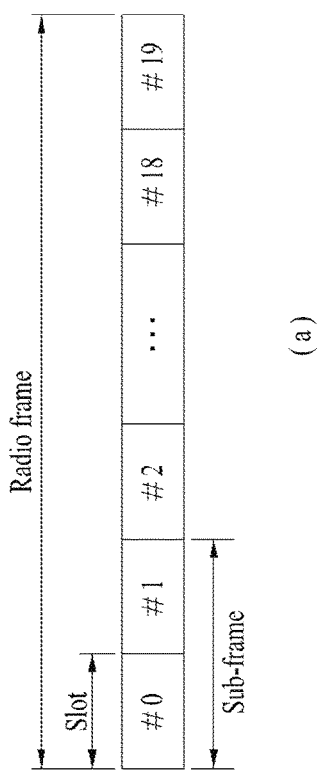
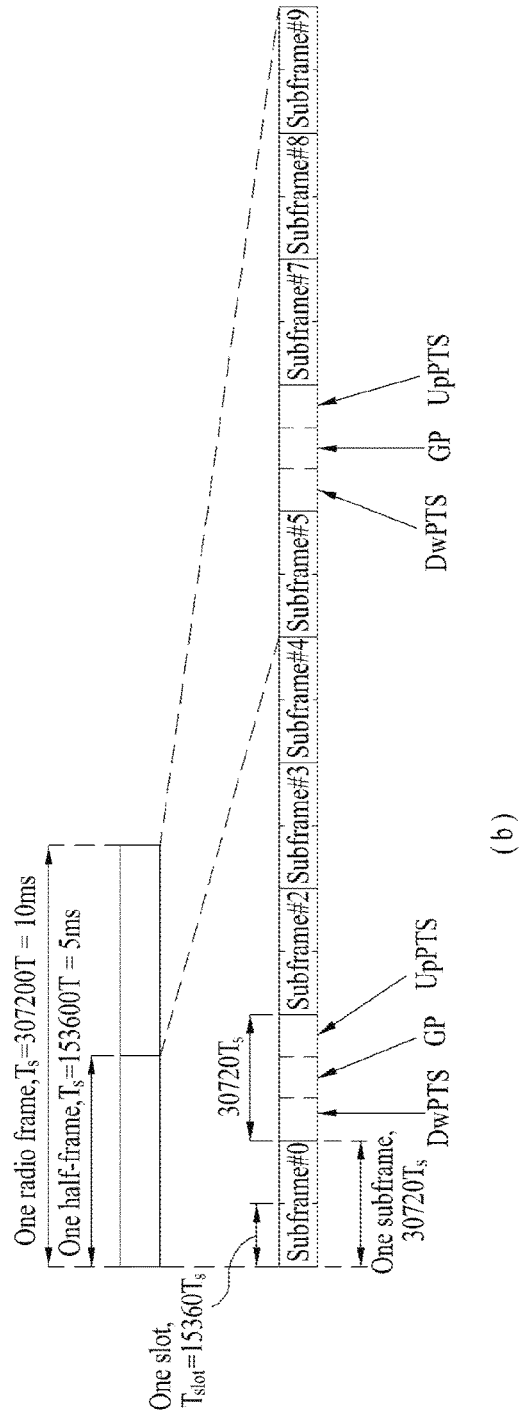

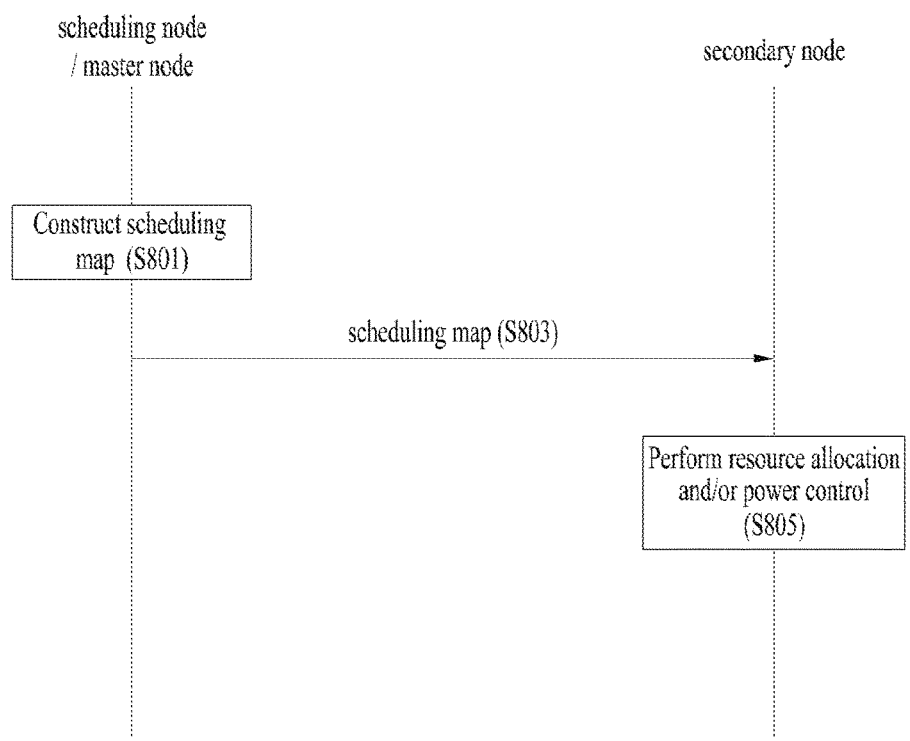
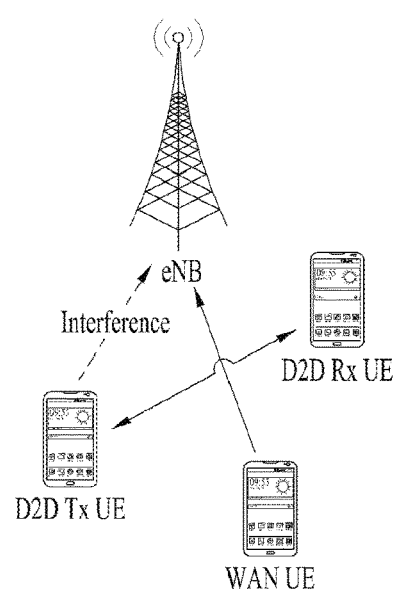

METHOD AND DEVICE FOR ACQUIRING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/006047, filed on Jul. 7, 2014, which claims the benefit of U.S. Provisional Application Nos. 61/843,063, filed on Jul. 5, 2013, and 61/986,090, filed on Apr. 29, 2014, the contents of which are all hereby incorporated by reference herein in their entirety.

TECHNICAL FIELD

The present invention relates to a wireless communication system, and more particularly to a method and apparatus for transmitting and receiving control information during Device to Device (D2D) communication.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

A Device to Device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention is to provide a method for transmitting and receiving signals to minimize interference influence during Device to Device (D2D) communication.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for allowing a secondary node to transmit a signal in a wireless communication system including: receiving a scheduling map from one of a scheduling node and a master node; performing at least one of scheduling control and transmit (Tx) power control on the basis of the scheduling map; and transmitting a signal on the basis of the scheduling or transmit (Tx) power control result, wherein, if the secondary node transmits each of control information and data in a discontinuous frequency domain, the transmit (Tx) power control includes coordination of maximum transmit (Tx) power of the control information or coordination of maximum transmit (Tx) power of the data.

In accordance with another aspect of the present invention, a secondary node device for use in a wireless communication system includes: a reception (Rx) module; and a processor, wherein the processor receives a scheduling map from one of a scheduling node and a master node, performs at least one of scheduling and transmit (Tx) power control on the basis of the scheduling map, and transmits a signal on the basis of the scheduling or transmit (Tx) power control result. If the secondary node transmits each of control information and data in a discontinuous frequency domain, the transmit (Tx) power control includes coordination of maximum transmit (Tx) power of the control information and coordination of maximum transmit (Tx) power of the data.

The first and second technical aspects may include all or some of the following items.

The coordination of the maximum transmit (Tx) power of the control information and the coordination of the maximum transmit (Tx) power of the data may be applied simultaneous with limitation of a difference in the maximum transmit (Tx) power.

The difference between the maximum transmit (Tx) power of the control information after completion of the coordination and the maximum transmit (Tx) power of the data after completion of the coordination may be equal to or less than a predetermined value.

The coordination of the maximum transmit (Tx) power of the control information and the coordination of the maximum transmit (Tx) power of the data are performed by a specific value in which interference applied to a component carrier (CC) adjacent to a component carrier (CC) through which the control information and data are transmitted is considered; and the maximum transmit (Tx) power difference limitation may be performed by a predetermined value caused by interference generated when transmission of the control information affects transmission of the data.

The interference applied to a component carrier (CC) adjacent to the component carrier (CC) through which the control information and data are transmitted may be caused by at least one of in-band emission, harmonic or intermodulation.

The control information and the data may be transmitted on a first component carrier (CC); and a Device to Device (D2D) signal may be received on a second component carrier (CC) adjacent to the first component carrier (CC).

The secondary node may drop reception of the D2D signal on the second component carrier (CC) when the control information and the data are transmitted on the first component carrier (CC).

The scheduling map may include at least one of a first region in which interference occurs due to transmission of a primary node or a second region in which transmission of the primary node needs to be guaranteed.

The scheduling map may include at least one of information indicating a resource allocation region of a primary node, emission information based on signal transmission of the primary node, ID (identification) of the primary node, maximum transmit (Tx) power information of a secondary node, ID of the secondary node or information associated with an application range of the scheduling map.

Scheduling of the secondary node may be limited either in a first region in which interference occurs due to transmission of the primary node or in a second region in which transmission of the primary node needs to be guaranteed.

The secondary node may transmit a signal using power that is equal to or less than a value of the maximum transmit (Tx) power information.

The secondary node may transmit the maximum transmit (Tx) power information only when the signal measurement result of the primary node is equal to or less than a predetermined threshold value.

If the primary node is a Wide Area Network (WAN) UE, the transmit (Tx) power control may be performed using Reference Signal Receive Power (RSRP), a path attenuation estimation value from the RSRP, and a target emission level.

Advantageous Effects

As is apparent from the above description, the embodiments of the present invention can efficiently transmit and receive D2D signals through interference control.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 exemplarily shows a radio frame structure.

FIGS. 7 to 13 are conceptual diagrams illustrating resources for transmitting control information according to embodiments of the present invention.

BEST MODE

Figure 2:
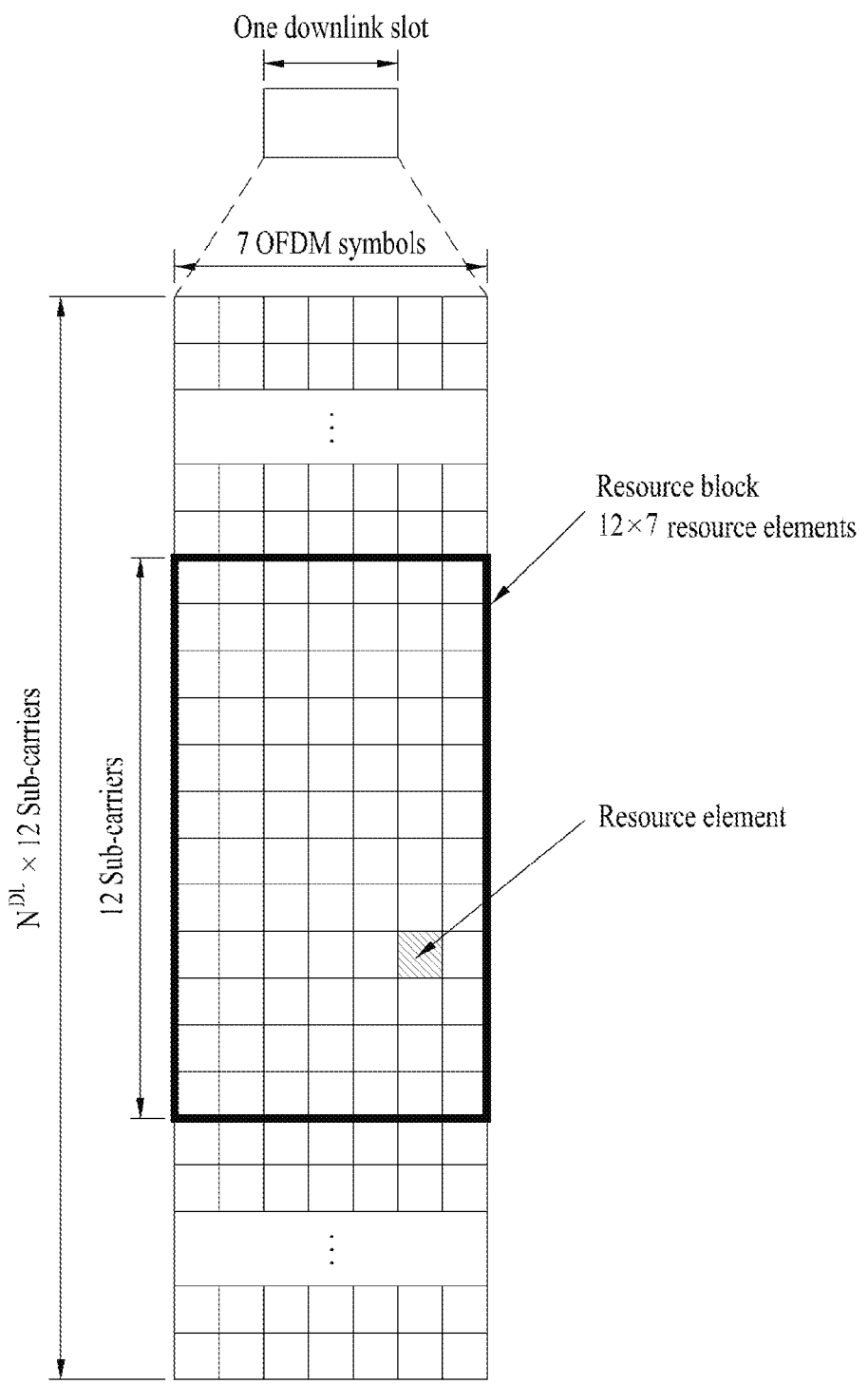
FIG. 2 exemplarily shows a resource grid of one downlink slot.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
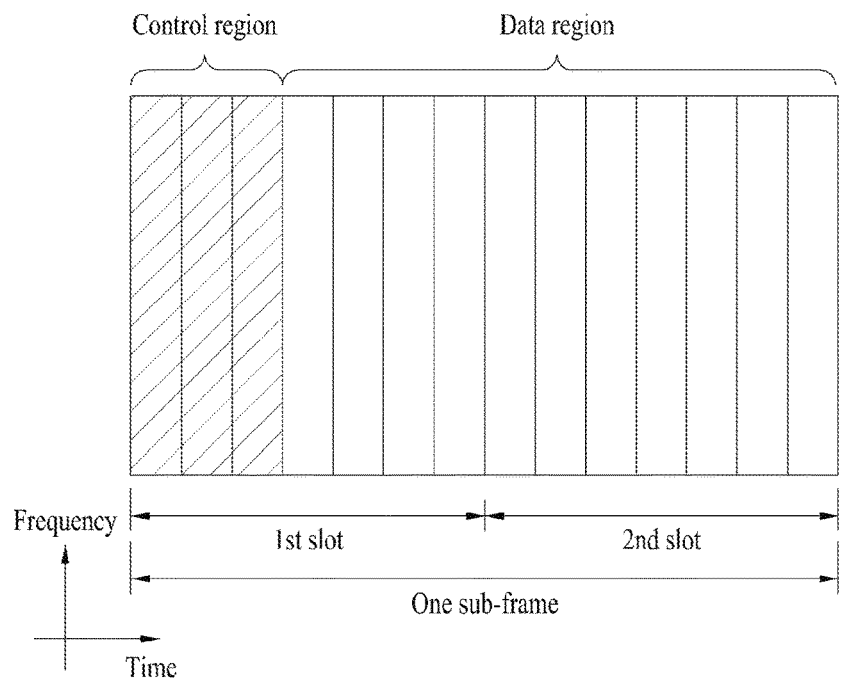
FIG. 3 exemplarily shows a downlink subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI).

If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
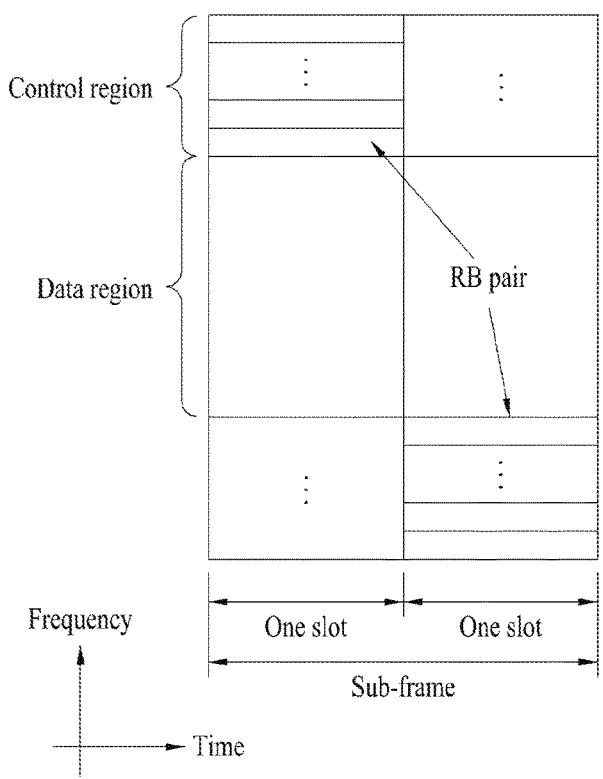
FIG. 4 exemplarily shows an uplink subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Carrier Aggregation (CA)

Figure 5:
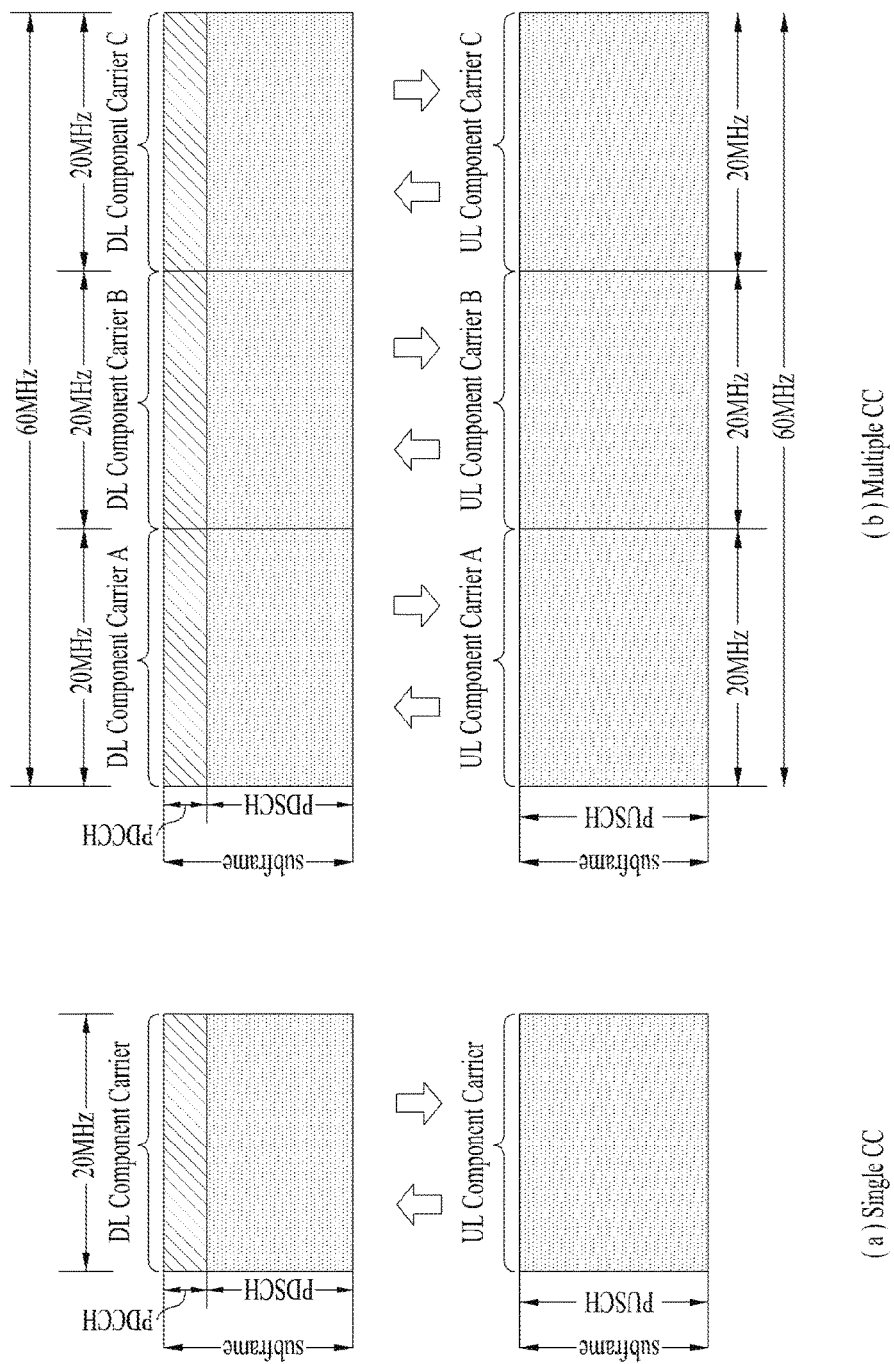
FIG. 5 is a conceptual diagram illustrating carrier aggregation (CA).

FIG. 5 is a diagram illustrating carrier aggregation (CA). The concept of a cell, which is introduced to manage radio resources in LTE-A is described prior to the carrier aggregation (CA). A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and an uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports carrier aggregation (CA), a network may configure one or more SCells in addition to a PCell initially configured during connection establishment after initial security activation is initiated.

Carrier aggregation (CA) is described with reference to FIG. 5. Carrier aggregation (CA) is a technology introduced to use a wider band to meet demands for a high transmission rate. Carrier aggregation (CA) can be defined as aggregation of two or more component carriers (CCs) having different carrier frequencies. FIG. 5(a) shows a subframe when a conventional LTE system uses a single component carrier (CC) and FIG. 5(b) shows a subframe when Carrier aggregation (CA) is used. In FIG. 5(b), 3 CCs each having 20 MHz are used to support a bandwidth of 60 MHz. The CCs may be contiguous or non-contiguous.

A user equipment (UE) may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific user equipment (UE) may be limited to M (<N) CCs. Various parameters for carrier aggregation (CA) may be configured cell-specifically, UE group-specifically, or UE-specifically.

Figure 6:
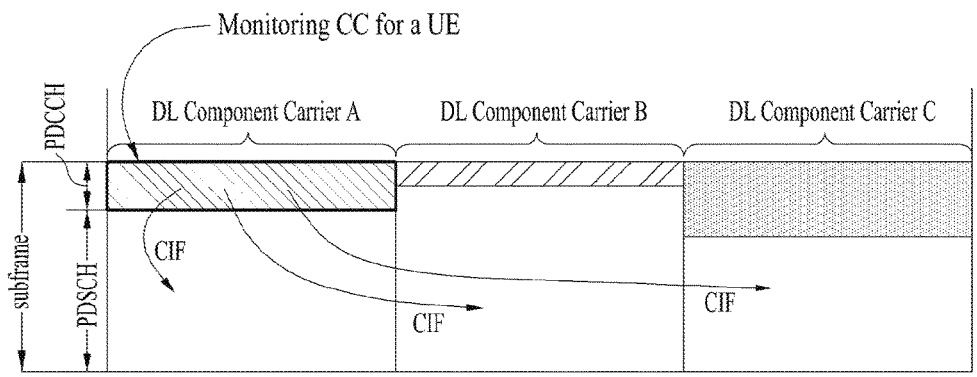
FIG. 6 is a conceptual diagram illustrating cross carrier scheduling.

FIG. 6 is a diagram illustrating cross-carrier scheduling. Cross carrier scheduling is a scheme by which a control region of one of DL CCs (Primary CC, PCC) of a plurality of serving cells includes downlink scheduling allocation information the other DL CCs (Secondary CC, SCC) or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 6, downlink allocation information for DL CC B and DL CC C, that is, information about PDSCH resources is transmitted through a PDCCH in a control region of DL CC A. A user equipment (UE) can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 6, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

A case may be encountered in which ACK/NACK information for a large amount of downlink data according to application of CA and/or a large amount of downlink data transmitted in a plurality of DL subframes in a TDD system needs to be transmitted through a PUCCH in a subframe. In this case, it may be impossible to correctly transmit ACK/NACK information using the above-mentioned methods, when the number of ACK/NACK bits to be transmitted is greater than the number of ACK/NACK bits that can be supported by ACK/NACK bundling or multiplexing.

Figure 7:
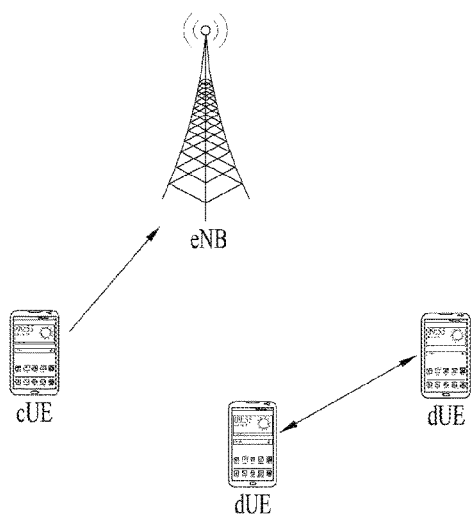

A method for transmitting and receiving signals through D2D communication to reduce interference between a cellular UE (i.e., dUE of FIG. 7, hereinafter referred to as a Wide Area Network (WAN) UE) and a D2D UE (i.e., dUE of FIG. 7) or interference between D2D UEs according to the embodiments will hereinafter be described in detail. In the following description, WAN may conceptually include not only LTE/LTE-A but also other communication systems based on other communication specifications. Therefore, it may be appreciated that the WAN UE includes capability for supporting one or more communication systems contained in WAN. In addition, although the following description will assume that D2D UE can perform the D2D communication using UL resources, it should be noted that the following description may also be applied to the case of using DL resources.

Two interference situations may occur between the WAN UE and the D2D UE. The first interference situation may indicate that the WAN UE generates interference in the D2D UE. In more detail, under the condition that the WAN UE and the D2D UE are located adjacent to each other, if there is a high difference in Tx power between the WAN UE and the D2D UE (e.g., D2D UE located in a cell edge region located in the vicinity of the WAN UE, and a D2D desired UE located in the same edge region), the D2D UE may receive serious interference due to in-band emission caused by transmission of the WAN UE. For example, assuming that RBs of the D2D UE receive serious interference from the PUSCH/PUCCH signal of the WAN UE or the in-band emission component of the corresponding channel, D2D reception (Rx) performance may be deteriorated. In this case, it is necessary for the D2D UE to perform D2D resource allocation or Tx power adjustment in consideration of the resource region used by the WAN UE and/or interference caused by the in-band emission.

The second interference situation may indicate that the D2D UE applies interference to the WAN UE. For example, if a D2D discovery signal having high power is transmitted within a PUSCH region located in the vicinity of the PUCCH region, serious interference may occur in base station (BS) Rx performance due to in-band emission. In this case, the D2D signal applied to the PUSCH region located in the vicinity of the PUCCH region may perform power reduction, or may require scheduling limitation (i.e., no D2D signal is transmitted in some RBs located in the vicinity of the PUCCH region).

Signals/UEs needs to be guaranteed (should be guaranteed) transmission in the interference situation of the WAN UE and the D2D UE may be different according to individual cases. For example, assuming that the emergency signal is transmitted through D2D under the emergency situation, the WAN UE needs to transmit signals without passing through the corresponding region. In order to cope with the above-mentioned situations, the primary—secondary relationship may be established as shown in the following table 1.

TABLE 1

| | Primary Node | Secondary Node |
|---|---|---|
| #1 | WAN UE | D2D UE |
| #2 | D2D UE | WAN UE |
| #3 | D2D broadcast/groupcast UE | D2D unicast UE |
| #4 | D2D unicast | D2D unicast |

From among D2D unicast data, the relationship between the primary and secondary nodes may be established according to data priority. For example, from among public safety unicast and personal social network data, the public safety unicast may have higher priority. For example, a priority level may be divided into N priority levels, and the UE may have higher priority as a number value gradually increases (or gradually decreases). This priority may be pre-defined according to service type, traffic type, etc.

Subsequently, the following terms shown in Table 2 may be used. The term "node" may represent all kinds of devices configured to participate in WAN and/or D2D communication, for example, a base station (BS), a UE, a cluster head, etc. The term "node" may conceptually include the node group.

TABLE 2

| | |
|---|---|
| Scheduling Map | The scheduling map may be a physical layer channel (e.g., PUSCH/PUCCH) PRB (index) used by a specific UE or a UE group, or may be a complementary set of the physical layer channel. For example, the scheduling map may be represented in the form of binary information with respect to a subcarrier group (e.g., PRB) of a specific frequency region. If the binary information is set to 1, the secondary node may be denoted by a scheduling available region. If the binary information is set to 0, |

TABLE 2-continued

| | |
|---|---|
| | this expression may be denoted by a specific region in which it is impossible to perform resource allocation and resources must be transmitted at predetermined power or less. The scheduling map may be used for the following two usages. 1) The first usage: This may indicate a warning signal regarding the resource position at which strong interference may occur by the primary node. 2) The second usage: This may indicate a protection request regarding the position of resources reserved to use primary nodes. |
| Primary node/channel | When configuring the scheduling map, a target UE (or a UE group) and physical channels of the UE or some parts of the channels may be used. For example, the PUSCH or PUCCH region of a specific WAN UE may be a primary channel. The scheduling map regarding a specific primary channel of the primary node may be a region in which high interference occurs by the primary node, or may be a region to be protected because the primary node transmits the scheduling map. |
| Secondary node/channel | The secondary node/channel may be a UE (or UE group) configured to acquire a resource allocation region or Tx power from the scheduling map regarding the specific primary channel. For example, according to the scheduling map in which each of a frequency resource region (e.g., RB) allocated to a specific primary channel and a resource region in which high interference occurs due to in-band emission is denoted by '1', the secondary node may use only the resource region denoted by '0'. |
| Master Node | The master node may autonomously receive scheduling map information (signal sensing of a contiguous UE or recognition of position information of the contiguous UE), such that it can recognize the received information. Alternatively, the master node may be defined as a UE capable of sensing the signal of the primary node and avoiding the sensed signal. Alternatively, the master node may be a node capable of autonomously acquiring scheduling information of the contiguous UE. (For example, in the case in which the presence or absence of a UE located in a short range through a discovery signal can be recognized and interference information can be estimated from the corresponding UE) |
| Slave Node | The slave node may be a node capable of receiving the scheduling map from the master node. Since this UE is unable to autonomously recognize the scheduling map regarding the contiguous primary node, the UE may receive scheduling map information from the master node (this may be a BS or UE), and may use the received information in the scheduling process. There is a high possibility that the slave node is a D2D UE. |
| Scheduling Node | The scheduling node may be a UE, or may be a UE having capability to schedule time/frequency resources of other UEs. For example, since the BS is not present outside the coverage, a specific UE can schedule radio resource allocation of other UEs. |

Embodiment 1

The first embodiment (Embodiment 1) may indicate that interference control is performed through the approximate available resource region (such as a scheduling map or the like) and/or Tx power associated values. FIG. 8 exemplarily shows the entire procedure of the first embodiment. Referring to FIG. 8, the scheduling node or the master node may construct the scheduling map in step S801. In more detail, the scheduling node may construct the scheduling map on the basis of the scheduling information of the primary node. In addition, the master node may detect a signal of the primary node and thus construct the scheduling map. Of course, the master node may receive the scheduling map configured by the scheduling node through physical layer signaling or higher layer signaling. The secondary node may receive the scheduling map from the scheduling node or the master node in step S803. The above-mentioned process may also be carried out only when there is a request of the secondary node, or may be periodically or aperiodically carried out as necessary. Transmission of the scheduling map may be based on higher layer signaling and/or physical layer signaling. The secondary node having received the scheduling map may perform resource allocation and/or power control on the basis of the scheduling map in step S805.

Respective steps may be carried out according to different periods, and a detailed description thereof will be given below.

Embodiment 1-1 (Scheduling Map Construction and Signaling Method)

The scheduling map may be generated on the basis of proximity information (e.g., IDs of contiguous UEs, signal strength from the corresponding UE, or the like), or may also be generated on the basis of feedback proximity information obtained when a specific master node forms the cluster. In addition, the scheduling node may update the scheduling map on the basis of such proximity information, or may aperiodically (e.g., if the scheduling map request is present, or if a predetermined time elapses before or after the scheduling map is signaled) or periodically inform the master node of the corresponding information through physical layer signaling or higher layer signaling. Of course, the scheduling map may also be transmitted only when a request of the master node is present.

The scheduling map may include at least one of the following items (a), (b), (c), (d), (e), (f), (g), (h), (i) or (j). Item (a) may be a signal for indicating a resource allocation region of a specific primary node/node group or a specific primary channel. Item (b) may be a signal for indicating a resource allocation available region of a specific secondary node/node group or a secondary channel. Item (c) may be a signal for indicating a region including at least one of in-band emission (including carrier leakage and I/Q image) of a specific primary node/node group or a specific primary channel, out-band emission or spurious emissions (e.g., harmonic, inter-modulation, etc.). Item (d) may be a maximum Tx power of a specific secondary node/node group or a secondary channel. Item (e) may be a UE ID of a specific primary node/node group. Item (f) may be a UE ID of a specific secondary node/node group. Item (g) may be information regarding the application range of the scheduling map such that time information (e.g., subframe/radio frame index, or the number of valid subframe/radio frames after reception of the scheduling map) in which the corresponding scheduling map is valid can be recognized. Alternatively, in the case of using the SPS (Semi Persistent Scheduling)— related scheduling map, the item (g) may be a period (this period may be represented by a radio frame and/or a subframe, and then signaled) and a subframe offset. Item (h) may be an IoT ('IoT' means a ratio between the total received power spectral density Io, including signal and interference, and the thermal noise level N0, T is a channel gain) level of a specific cell or a current IoT margin with respect to a target IoT. The item (i) may be a target emission level of a specific primary channel. The item (j) may include at least one of a specific secondary node/node group or a secondary channel MPR (maximum power reduction).

The following table 3 is one example of the scheduling map field. Some items (a, c) from among the above-mentioned enumerated items (a, c, d, f, g) may be contained in the scheduling map subfield.

TABLE 3

| Field | UE ID field (master node ID and/or primary node ID and/or secondary node ID) | Valid # of subframes | Scheduling map | Max. Transmission Power level on Scheduling map |
|---|---|---|---|---|
| # of bits | N1 | N2 | N3 | N4 |

From among a plurality of fields capable of being contained in the scheduling map, the fields (a, b, c) may indicate a resource allocation region in the frequency domain. Therefore, a), b), c) may be signaled on an RB basis or on an RB-group basis. In addition, the fields (a, b, c) may be combined and then signaled. For example, according to the above-mentioned case in which the fields (a, c) are simultaneously signaled, some RBs located in the vicinity of the primary channel are included in consideration of the primary channel and the in-band emission based on the primary channel, such that the scheduling map may be configured. The secondary node/node group having received the above-mentioned information may transmit/receive signals without passing through the corresponding region.

Embodiment 1-2 (Operation of the Secondary Node Having Received the Scheduling Map)

Embodiment 1-2-1 (Decision/Limitation of the Scheduling Resource Region)

The secondary node having received the secondary map may derive the scheduling available region and the scheduling unavailable region from the scheduling map. If the valid subframe index having a valid scheduling map is contained in the scheduling map, the scheduling map may be applied only to this valid subframe (i.e., scheduling based on the scheduling map is performed), and D2D communication may not be performed in the subframe having an invalid scheduling map or D2D communication may be freely performed in the subframe having the invalid scheduling map. If D2D communication is performed prior to reception of the scheduling map, the D2D UE may continuously perform D2D communication in the remaining regions other than the scheduling limited region after reception of the scheduling map, or may stop D2D communication during a predetermined time or may completely stop D2D communication (specifically, if the region limited by scheduling is higher than a predetermined value).

Embodiment 1-2-2 (Transmit (Tx) Power Control)

If maximum Tx power is contained in the scheduling map, Tx power may be reduced not to exceed the maximum Tx power. If a maximum power reduction (MPR) with respect to maximum Tx power is contained in the scheduling map, the UE may reduce Tx power by a predetermined 'dB' written in the maximum MPR from the corresponding frequency resource, and then transmit the Tx power. In this case, decision of the Tx power based on the MPR or the maximum Tx power may be applied only to the case in which the measurement result of the primary node signal (e.g., RSRP or the like) is equal to or less than a threshold value. That is, only when the primary node is present within a short range, the Tx power control is performed, such that the occurrence of secondary node performance deterioration by mandatory Tx power control can be prevented.

If the scheduling map does not include the maximum Tx power value or MPR, etc., Tx power may be reduced by a predetermined ratio within the emission region (in-band emission, out-band emission, or spurious emission). For example, assuming that a predetermined region in which data must be transmitted at low power for the primary node is contained in the scheduling map, desired data may be transmitted at lower Tx power reduced by a predetermined ratio with respect to other regions within the corresponding region.

In addition, the scheduling node (e.g., a base station) may transmit an IoT margin of the current network and the scheduling map to the secondary node, or may also transmit the IoT margin to the secondary node, separately from the scheduling map. Therefore, the UE may establish the maximum Tx power not only through path attenuation based on UE RSRP, but also through the IoT margin.

Figure 10:
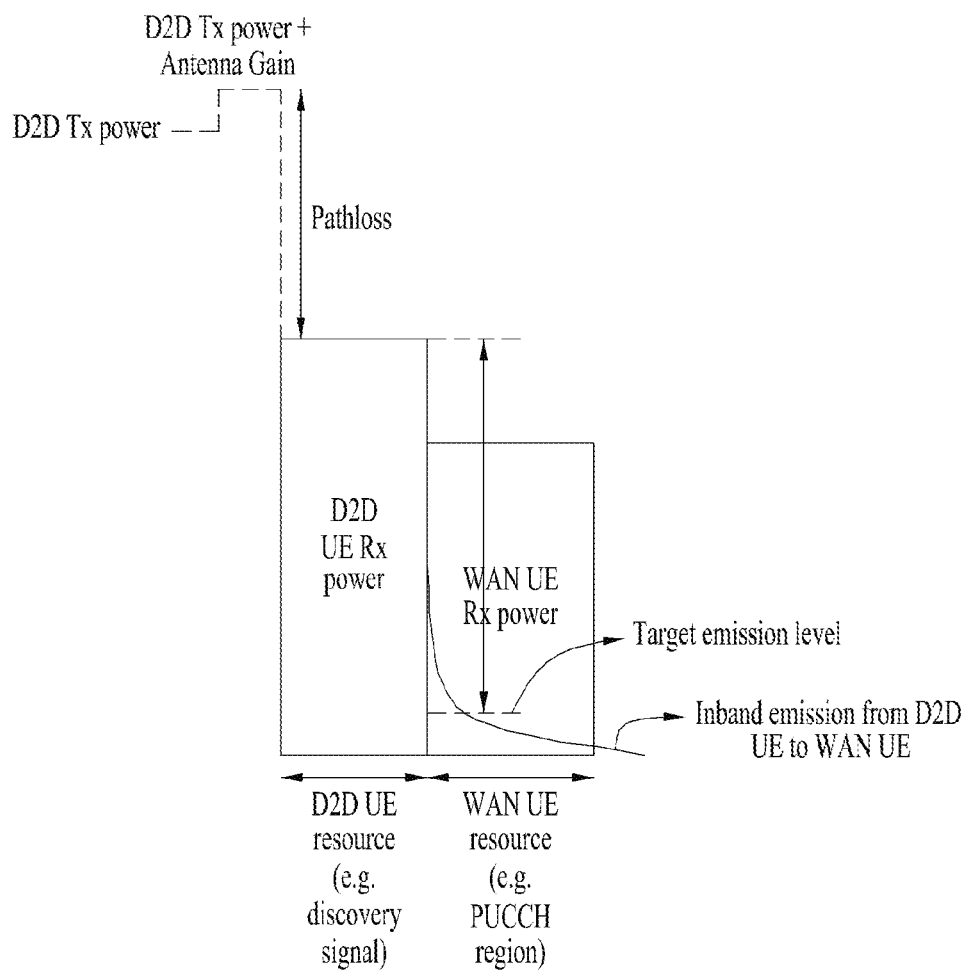

As shown in FIG. 9, if the primary node is the WAN UE, signal transmission of the D2D UE acting as the secondary node may cause interference to the base station (BS). Tx power control may be carried out using RSRP measurement from the base station (BS). In more detail, the secondary node may measure the RSRP to estimate the path attenuation, and may determine the Tx power using this path attenuation and a target emission level. This example is shown in FIG. 10.

In the above-mentioned embodiment, the operation for allowing the scheduling node to perform signaling of the IoT margin or the target emission level may indicate that the scheduling node performs signaling of the Tx power parameter. That is, the scheduling node may perform signaling of both the Tx power constant parameter (P0) used by the secondary node and the path attenuation compensation constant (alpha: α) in consideration of the IoT margin or the target emission level. In the case of considering the in-band emission, the value (P0) and the path attenuation compensation constant (alpha: α) may be established in different ways according to respective frequency resources. Since the degree of in-band emission is gradually increased in the vicinity of the allocated RBs, the Tx power may be greatly reduced more than other RBs due to the occurrence of in-band emission in the region located in the vicinity of the primary node channel.

Embodiment 1-2-3 (Frequency Hopping)

In order to average out the influence of in-band emission, hopping of the frequency region may be performed. The UE in which resources are allocated to a contiguous position in the frequency domain may mitigate the influence of in-band emission from a specific UE by changing the frequency resource transmission position for each slot/subframe. In this case, the region in which interference occurs in the primary node or interference must be prevented from occurring may be excluded from the hopping frequency resource due to the in-band emission or the like, such that data can be transmitted at power lower than the maximum Tx power based on MPR. (In extremis, the data may be transmitted at Tx power of 0 at the corresponding RB, and may not be transmitted at a specific RB located in the vicinity of the primary channel.)

In the case of using Tx power during frequency hopping, the method shown in the embodiment 1-2-2 may be used according to frequency position.

Embodiment 1-3 (Transmission of Information Needed to Construct the Scheduling Map)

Referring to FIG. 8, prior to configuring the scheduling map, the secondary node may inform the scheduling node of specific information indicating that the primary node is located in the vicinity of the secondary node through discovering or sensing, or may request the scheduling map. That is, construction of the scheduling map may be carried out through triggering caused by the secondary node. (The scheduling map configured by such triggering may be selectively configured only for a specific primary node or for a channel (e.g., a PUCCH region of the WAN UE or PUSCH region established as SPS) persistently transmitted by a specific UE, such that the resultant data may be signaled to the secondary node through physical layer signaling or higher layer signaling.) If information regarding the presence or absence of discovery is periodically or aperiodically reported to the scheduling node, the above-mentioned operation need not be performed.

In addition, the scheduling node may first inform the secondary node of the presence of the primary node. That is, the scheduling node may first broadcast an ID of the primary node to be initially scheduled.

DCI format may be used for broadcasting. This DCI format may be used for D2D. A user equipment (UE) having an idle state may be detected in the paging section. ID of the WAN UE currently scheduled is contained in this D2D DCI, and discovery for the corresponding UE ID is performed. The UE scheduled to perform D2D communication may request the scheduling map for the corresponding primary node from the scheduling node, and may autonomously configure the scheduling map of the corresponding UE (in the case of using the master node). In more detail, for example, an ID of the currently scheduled UE or an ID of a UE to be scheduled in some subframes may be contained in DCI, such that the D2D UE can discover the corresponding UE ID. The D2D UE may perform discovery to recognize whether a UE ID indicated by the BS is present in a peripheral region. If the UE is not present in the peripheral region, D2D resource allocation may be freely carried out. If the UE ID indicated by the BS is discovered, the corresponding information may be reported to the BS, or the scheduling region of the corresponding UE may be estimated, such that D2D resource allocation may be performed without passing through the corresponding region. In this case, the D2D UE may discover the corresponding UE ID, and may also detect the strength of a discovery signal or the strength of an RS reception signal of the primary UE. If the detected result is equal to higher than a predetermined threshold value (or a specific value indicated by the network), resource allocation or Tx power limitation may be performed, or D2D communication may be prevented in the specific subframe/specific frequency resources.

Embodiment 1-4

The scheduling node may be a master node. In this case, the scheduling node may directly signal necessary information to the slave node or the slave node group.

Figure 11:
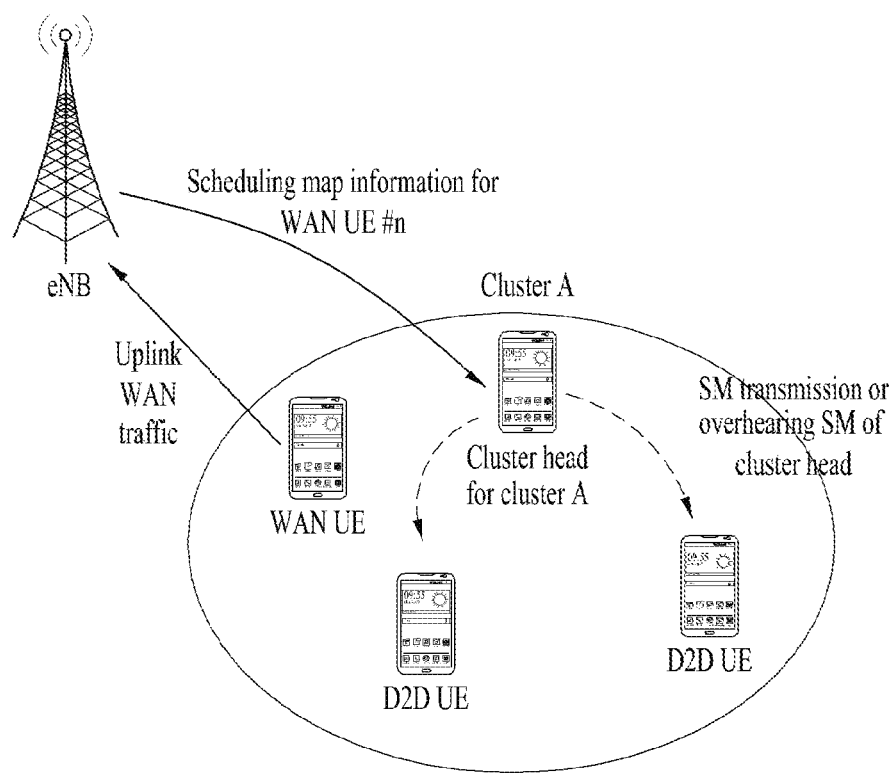

The master node may partially act as a scheduler of the UE group. For example, the scheduling map is transmitted on the condition that the master node does not perform resource allocation for the entire UEs contained in the group, and the region not used by the secondary node during scheduling may be designated. The master node and the slave node are located within a short distance, and it may be assumed that the master node and the slave node have the same location information. In this case, it can be assumed that the slave node and the master node use the same scheduling map without additional signaling. As a result, the BS coverage is relatively very large in size, such that the cluster UE group (UE belonging to the Cluster A of FIG. 11) is considered to be one D2D UE. The slave node may perform overhearing of the scheduling map information signaled from the scheduling node to the master node. The scheduling map information of the master node may be used for scheduling, or scheduling map information may be signaled from the master node through physical layer signaling or higher layer signaling. For example, the slave node may perform overhearing of the DCI through which the scheduling map information is signaled from the scheduling node to the master node, may recognize the scheduling map of its own master node, thereby determining its own Tx resources. For this purpose, DCI received by the D2D master node may be commonly used for a UE group, and an ID (RNTI) of the master node is pre-signaled to the slave node, such that the slave node must perform blind decoding (BD) of DCI through RNTI of the master node. In another implementation example, the slave node may not perform overhearing of the DCI of the master node, and may directly perform overhearing of DCI of the primary node. RNTI of a primary UE (or a UE group) to be actively protected in advance may be pre-signaled to the slave node through physical layer signaling or higher layer signaling. The slave node performs blind decoding of DCI using the RNTI of the corresponding primary UE, recognizes resource allocation information of the corresponding UE, and determines Tx resources of the slave node without passing through the corresponding resource. In this case, D2D is performed only in the UL resource, and the secondary UE may perform blind decoding only for the DCI format corresponding to the UL grant so as to reduce unnecessary blind decoding.

Embodiment 1-5

Although the above-mentioned embodiments assume the use of a single component carrier (CC), if carrier aggregate (CA) is applied or if the primary node and the secondary node are operated in different carriers, the present invention can be used. When the scheduling map is configured, the master node or the scheduling node may configure the scheduling map without passing through the corresponding resource region, on the condition that serious interference occurs in a current CC due to the occurrence of strong power transmission in a contiguous CC.

Figure 12:
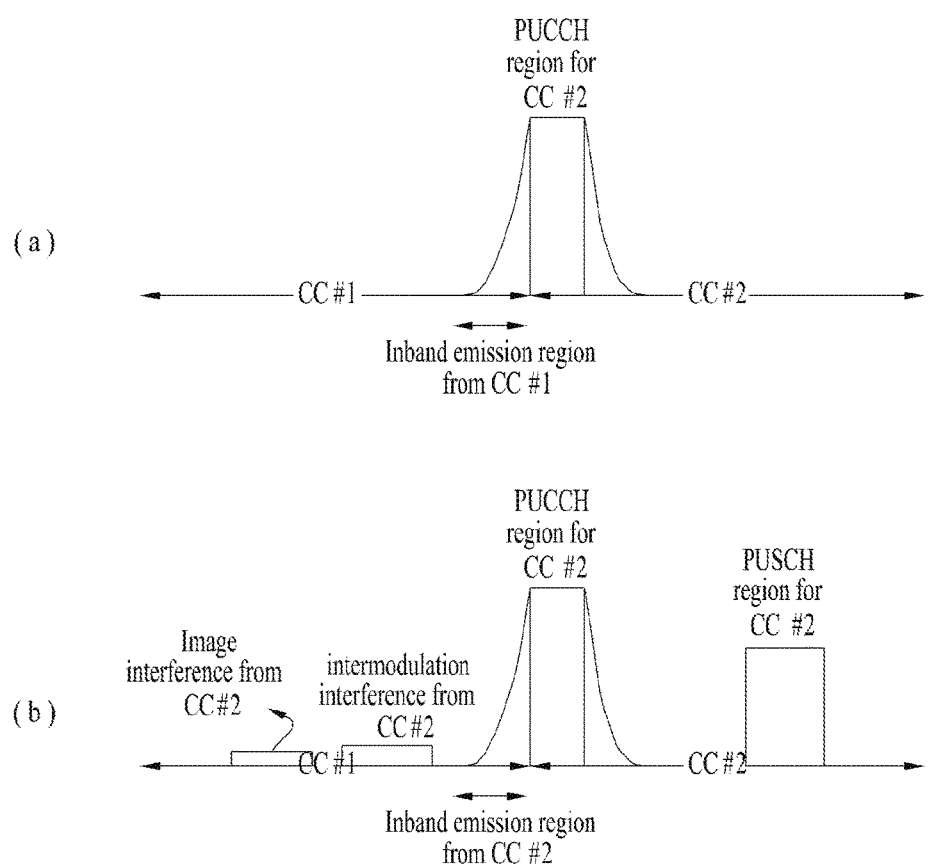

In FIG. 12, secondary nodes may perform D2D communication at the first component carrier (CC #1), and the primary node may transmit the PUCCH signal at the second CC (CC#2). Referring to FIG. 12(a), since interference caused by PUCCH transmission of the primary node may occur in the RB located in the vicinity of some CCs from CC#1 to CC#2, the scheduling limitation region may be established when the scheduling node or the master node configures the scheduling map. In addition, RBs in which interference based on inter-modulation occurs may also be established as the scheduling limitation region.

Embodiment 1-5-1

As can be seen from FIG. 12(b), each of control information (e.g., PUCCH) and data (e.g., PUSCH) may be referred to as 'multi-cluster transmission' in a discontinuous frequency region, and an associated example is shown in FIG. 12(b).

Referring to FIG. 12(b), if the primary node performs multi-cluster transmission at CC#2, the scheduling map in which at least one of in-band emission and the harmonic or inter-modulation component is considered may be transmitted at CC#1. Alternatively, the scheduling node may inform the secondary node of specific information indicating whether multi-carrier transmission is performed through higher layer signaling or physical layer signaling, such that the interference component may be considered.

Embodiment 1-5-2

If the secondary node transmits each of control information and data in the discontinuous frequency region, power control for transmission of the control information and/or data may be carried out. In more detail, the secondary node may transmit WAN control information and/or data on the first component carrier (CC). If D2D transmission/reception is performed on the second CC adjacent to the first CC, multi-cluster transmission on the first CC may cause interference to D2D transmission/reception on the second CC, due to in-band emission and harmonic or inter-modulation, etc. Therefore, through Tx power or scheduling during multi-cluster transmission on the first CC, D2D signal transmission on the second CC may be protected.

Tx power control may include coordination of the maximum Tx power of the control information and/or coordination of the maximum Tx power of data. In this case, the above-mentioned methods (such as MPR or the like) shown in other embodiments may be applied to coordination of the maximum Tx power. Coordination of the maximum Tx power of the control information and coordination of the maximum Tx power may be performed independently. For example, the maximum Tx power control for the control information may be carried out by the first MPR, and the maximum Tx power control of the data information may be based on the second MPR (different from the first MPR value). Coordination of the maximum Tx power of the control information and coordination of the maximum Tx power of data may be carried out in consideration of interference applied to the second CC adjacent to the first CC.

Coordination of the maximum Tx power of the control information and coordination of the maximum Tx power of the data are performed, and at the same time there is a limitation in difference between the maximum Tx power values as necessary. In more detail, a difference between the maximum Tx power after coordination of control information and the maximum Tx power after coordination of data may be equal to or less than a specific value. In this case, the specific value may be a predetermined value, or may be signaled through physical layer signaling or higher layer signaling. For example, assuming that a specific UE transmits the WAN signal (e.g., PUCCH) at 10 dBm and a difference between the maximum Tx power values is limited to 15 dB, the D2D signal must be transmitted at −5 dBm or higher, such that the D2D signal distortion caused by the WAN signal may be limited. That is, limitation between the maximum Tx power values may indicate that transmission of the control information is carried out in consideration of interference applied to transmission of the above data.

The scheduling node may inform the nodes configured to transmit/receive the D2D signal of a specific signal indicating increment of the maximum Tx power at the component carrier (CC) in which unexpected interference occurs because several nodes are adjacent to each other to transmit/receive signals due to transmission of the secondary node (multiple clusters: i.e., multi-cluster). The above-mentioned information may be signaled to directly indicate the maximum Tx power. If the maximum Tx power of the D2D UE is established in advance, the corresponding information may be signaled in the form of MPI (Maximum Power Increase) in a different way from MPR. In this case, the MPI may indicate that data transmission is allowed at power higher than a predetermined maximum power.

If one node transmits multiple clusters (multi-cluster) through a specific CC or performs simultaneous transmission of PUCCH/PUSCH through the specific CC, the D2D signal and the WAN signal may simultaneously be transmitted at the corresponding CC. In this case, Tx power of the WAN signal will be decided by an indication message of the BS, and D2D Tx power may be established to prevent the occurrence of BS interference such that the D2D Tx power may be established by the D2D Tx power parameter semi-statically established by the BS. In this case, the D2D Tx power may be determined within the remaining range obtained when the Tx power used in WAN is subtracted from the maximum Tx power. In this case, if there is a high difference in Tx power between the WAN signal and the D2D signal as described above, the D2D signal Rx UE may incorrectly receive the D2D signal due to in-band emission of the WAN signal. As a result, unnecessary D2D signal transmission occurs, such that the D2D signal is desirably not transmitted. Therefore, the present invention provides a method for transmitting the D2D signal only when a difference in Tx power between the WAN signal and the D2D signal is equal to or less than a predetermined threshold value. In this case, if the WAN Tx signal uses most of the maximum Tx power, D2D Tx power may be freely limited, and a difference in Tx power between WAN and D2D may exceed a threshold value. Therefore, only when Tx power of the WAN is equal to or less than a threshold value, multi-cluster WAN PUSCH and D2D (PUSCH) transmission be carried out as necessary. The above-mentioned scheme may independently establish specific information indicating whether multi-cluster of the WAN signal is transmitted, and may also independently establish information indicating whether multi-cluster transmission of D2D/WAN (i.e., D2D/WAN simultaneous transmission) is performed.

Embodiment 1-5-3

If one node transmits the WAN signal through the first CC and transmits the D2D signal through the second CC, limitation of the maximum Tx power or limitation of the maximum Tx power for each CC may be used in consideration of interference caused by emission or the like. In the same manner as in the method for establishing Tx power in the above single CC, the Tx power of WAN may be established according to an indication message of the BS. In the case of using the D2D signal, the resultant value obtained when the UE subtracts Tx power used in WAN from the maximum Tx power may be set to the maximum Tx power. In this case, if D2D Tx power is greatly lower than the WAN Tx power, D2D transmission may not be performed. In contrast, Tx power for the D2D signal may first be established, and the remaining power may be set to the WAN Tx power. In this case, if the WAN Tx power does not reach the Tx power indicated by the BS, the WAN signal may drop as necessary.

Alternatively, assuming that one node respectively transmits the WAN signal and the D2D signal through the first CC and the second CC, the maximum Tx power of the WAN signal may be limited. In this case, the D2D Rx UE may inform the Tx UE of the scheduling available resource region or the scheduling unavailable region.

Under this situation, the node may skip or drop D2D signal reception in the second CC. The above-mentioned information may be represented by D2D Rx DRX. This example may indicate a detailed example of time information in which the scheduling map is valid.

Embodiment 1-5-4

If one node transmits the WAN signal through the first CC or receives the D2D signal through another CC, the D2D signal may be regarded as a secondary node, such that scheduling of the D2D signal may be limited or reception of the D2D signal may be skipped or dropped. This operation may be represented by D2D reception (Rx) DRX. This example may indicate a detailed example of time information in which the scheduling map is valid. Alternatively, D2D signal reception may be regarded as a primary node, Tx power of the WAN signal is reduced such that D2D reception can be protected.

In contrast, assuming that one UE receives the WAN signal (DL) at the first CC and transmits the D2D signal at the second CC, WAN signal reception may be regarded as a secondary node, such that scheduling may be limited or the WAN signal reception may be skipped or dropped. This skip or drop operation may be regarded as DRX from the viewpoint of the BS, and section information valid in the above-mentioned scheduling map may be signaled from the BS to the D2D Tx UE.

The above-mentioned description of the embodiment 1-5 may be applied only to the case in which the second CC is adjacent to the first CC. For example, if the frequency band of the first CC is spaced apart from the frequency band of the second CC by a predetermined distance, the above-mentioned description may not be used. In addition, this operation limitation may be caused by UE capability when the DL circuit is borrowed for reception of the D2D signal, or may be caused by UE CA (Carrier Aggregation) capability based on the CA band combination. In order to allow the BS to recognize the above-mentioned situation, the necessity of operation limitation associated with the CC combination in which the limited operation is needed or the UE capability information may be signaled to the BS. For example, the intra-band CA capable UE may report first information or second information to the BS. In this case, the first information may indicate the fact that serious interference occurs in a specific CC such that WAN Tx/Rx limitation or D2D Tx/Rx limitation occurs. The second information may indicate the fact that WAN DL reception is impossible during D2D reception because the UE is used as the FDD half duplex UE. The BS may configure WAN DL or D2D Rx DRX for a certain UE through necessity of the operation limitation or through UE capability signaling or the like. Alternatively, after the UE finishes skipping or dropping of Tx/Rx of the WAN or D2D signal, the UE reports this information to the BS such that the UE may inform the BS of specific information as to which frequency band has restriction. Alternatively, according to the above-mentioned operation, the BS may pre-recognize the degree of influence between the CCs. In addition, in the case of using a specific CC combination, the BS may inform the UE of specific information indicating that it is impossible to simultaneously perform D2D Tx/Rx and WAN Tx/Rx, the BS may establish WAN (DL) DRX for a specific UE in consideration of the above-mentioned result or may establish a D2D DRX for the specific UE. Alternatively, the BS may receive signaling information of the CA capability of the UE in advance, may pre-recognize specific information indicating whether WAN/D2D simultaneous transmission is possible in a certain CA, or may pre-recognize specific information as to which CA can be used for WAN/D2D simultaneous transmission. In addition, the BS may pre-recognize specific information indicating whether WAN transmission/D2D reception can be simultaneously performed, and may then perform scheduling on the basis of the recognized result.

Embodiment 1-6

The master node may autonomously configure the scheduling map using the RS sequence or the like of the primary node. In more detail, the master node may search for a neighbor UE, and may generate the list of UEs configured to transmit the strong signal. This list may be arranged in ascending numerical order of path attenuation or may be arranged in descending numerical order of path attenuation. The master node may request most significant RS information contained in the above list or N high-order RS information units contained in the above list from the scheduling node. (The master node may request certain information (e.g., a seed value of the RS sequence, the port number of RS or the CS (cyclic shift) value, etc.) capable of indicating RS information from the scheduling node). The above-mentioned process may be omitted in the case in which the RS sequence information can be directly acquired through discovery. The master node may estimate which resource region is used by the primary node using the above RS information, and may also estimate the signal strength in the corresponding resource region. The master node may detect the resource region (e.g., the PRB position) in which the primary node is scheduled, such that the strength of interference of the in-band emission region (carrier leakage, I/Q image) may be directly detected, or the corresponding information may be derived by the predefined equation. The scheduling map for the primary node may be configured on the basis of the above-mentioned result. For example, the in-band emission region may be regarded as a relative Rx power value of the resource allocation region obtained by the in-band emission request (Table 4) or by a modified equation of this request.

TABLE 4

| Parameter description | Unit | Limit (Note 1) | | Applicable Frequencies |
|---|---|---|---|---|
| General | dB | max{−25 − 10 · log$_{10}$(N$_{RB}$/L$_{CRBs}$), 20 · log$_{10}$ EVM − 3 − 5 · (∣Δ$_{RB}$∣ − 1)/L$_{CRBs}$, −57 dBm/180 kHz − P$_{RB}$} | | Any non-allocated (Note 2) |
| IQ Image | dB | −28 | Image frequencies when carrier center frequency < 1 GHz and Output power > 10 dBm | (Notes 2, 3) |
| | | −25 | Image frequencies when carrier center frequency < 1 GHz and Output power ≤ 10 dBm | |
| | | −25 | Image frequencies when carrier center frequency ≥ 1 GHz | |
| Carrier leakage | dBc | −28 | Output power > 10 dBm and carrier center frequency < 1 GHz | Carrier frequency (Notes 4, 5) |
| | | −25 | Output power > 10 dBm and carrier center frequency ≥ 1 GHz | |
| | | −25 | 0 dBm ≤ Output power ≤ 10 dBm | |
| | | −20 | −30 dBm ≤ Output power ≤ 0 dBm | |
| | | −10 | −40 dBm ≤ Output power <− 30 dBm | |

(Note 1):
An in-band emissions combined limit is evaluated in each non-allocated RB. For each such RB, the minimum requirement is calculated as the higher of P$_{RB}$ −30 dB and the power sum of all limit values (General, IQ Image or Carrier leakage) that apply. P$_{RB}$ is defined in Note 9.
(Note 2):
The measurement bandwidth is 1 RB and the limit is expressed as a ratio of measured power in one non-allocated RB to the measured average power per allocated RB, where the averaging is done across all allocated RBs.
(Note 3):
The applicable frequencies for this limit are those that are enclosed in the reflection of the allocated bandwidth, based on symmetry with respect to the centre carrier frequency, but excluding any allocated RBs.
(Note 4):
The measurement bandwidth is 1 RB and the limit is expressed as a ratio of measured power in one non-allocated RB to the measured total power in all allocated RBs.
(Note 5):
The applicable frequencies for this limit are those that are enclosed in the RBs containing the DC frequency if N$_{RB}$ is odd, or in the two RBs immediately adjacent to the DC frequencies if N$_{RB}$ is even, but excluding any allocated RB.
NOTE 6:
L$_{CRBs}$ is the Transmission Bandwidth
NOTE 7:
N$_{RB}$ is the Transmission Bandwidth Configuration
NOTE 8:
Δ$_{RB}$ is the starting frequency offset between the allocated RB and the measured non-allocated RB (e.g., Δ$_{RB}$ = 1 or Δ$_{RB}$ = −1 for the first adjacent RB outside of the allocated bandwidth.
NOTE 9:
P$_{RB}$ is the transmitted power per 180 kHz in allocated RBs, measured in dBm.

In addition, the master node may detect energy of a neighbor UE signal, or may recognize whether the discovery signal is detected. The master node may (periodically or aperiodically) exchange the Rx signal intensity of the discovery signal or GPS information received from the neighbor UEs, such that the proximity information and the scheduling map may be configured. This information may be periodically or aperiodically signaled to the specific secondary node/UE group, such that UE scheduling can be facilitated.

In the meantime, not only the primary-secondary relationship but also the secondary-secondary relationship may be established. That is, UEs having the same priority information may exchange the scheduling map with each other, such that negotiation related to resource allocation may also be carried out. In this case, the term "negotiation" may indicate that the complaining/warning signals are communicated between the UEs so that ICIC is performed in the frequency/time domain. In more detail, after the secondary nodes located adjacent to each other communicate the scheduling map (formed in the shape of HIT or OD with each other, necessary information may be selected at random within a collision region (in which HIIs or OIs conflict with each other) of the corresponding region, and the ID of the UE A and the ID of the UE B are added and "modulo 2" is then applied to the added result. If the modulo-2 result indicates the value of 1, the specific UE may use this result. In the above-mentioned collision region, UE A may inform the specific RB of the HIT information, and UE B may inform the same RB of the HIT information. Alternatively, the RB in which two UEs perform signaling of the OI information may not be scheduled by a certain UE because high interference occurs in both UEs.

Embodiment 2

The scheduling node may fully control resource allocation of D2D communication. In this case, the scheduling node may (periodically or aperiodically) receive proximity information from the UE through physical layer signaling or higher layer signaling, such that time/frequency resources for WAN and/or D2D communication may be scheduled on the basis of the above-mentioned result. In this case, the D2D UE may receive the resource allocation information such as the UL grant from the scheduling node. In this case, the scheduling node may collect proximity information as shown in the following methods.

First, periodic/aperiodic reporting of the UEs may be used. Through the discovery procedure, the UEs may periodically or aperiodically inform the scheduling node of N high-order UE IDs and/or strength information (e.g., RSRP between UEs, discovery signal reception strength, and RS reception intensity, etc.) of the signal received from the corresponding UE.

Second, the idle-state UE stores the list of UE IDs related to the contiguous UE during the discovery procedure and then performs D2D communication. If the RRC connection mode is achieved by initiation of WAN communication, all or some parts of the list of discovery UE IDs may be reported to the scheduling node through physical layer signaling or higher layer signaling. The above-mentioned process may be achieved by a request of the BS. When the UE enters the connection mode, proximity information may be pre-signaled to the scheduling node at a specific time.

Figure 13:
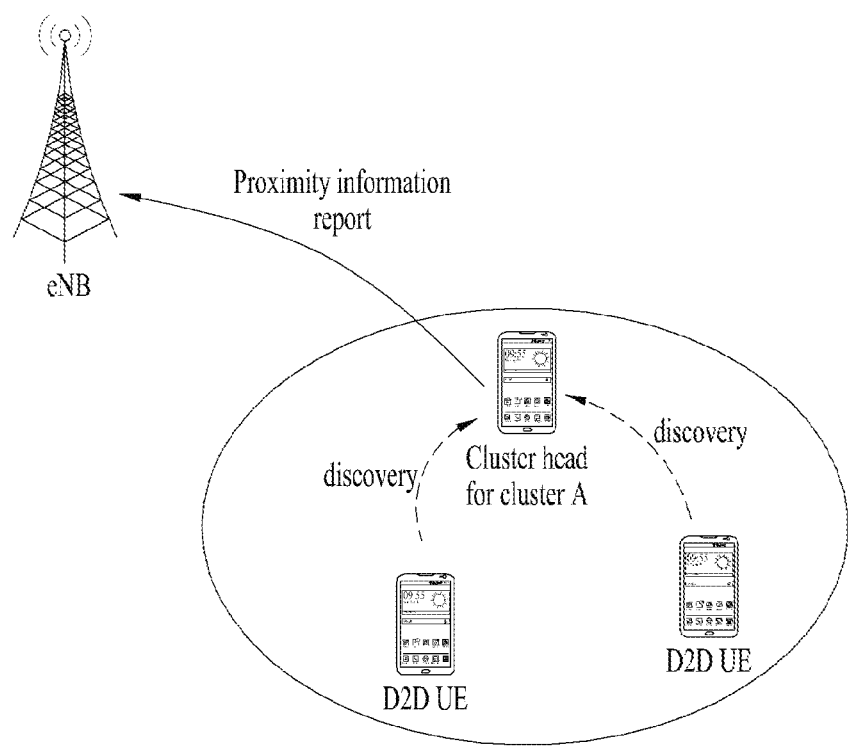

Alternatively, the idle-state UE may inform the neighbor RRC-connected node of the idle-state UE's ID through the discovery procedure, such that the UE ID information may be reported to the scheduling node as necessary. A specific UE may be used as the cluster head so that proximity information may be reported to the scheduling node. In this case, the specific UE may not be used as the RRC-connected node, may be pre-designated by the scheduling node, and may be a UE determined through handshaking (e.g., random selection) between the UEs. The corresponding UE may search for the neighbor UEs and switch to the RRC-connected mode, and may report proximity information to the scheduling node through physical layer signaling and/or through higher layer signaling. This request may use the discovery procedure. That is, 'proximity information report request field' information may be contained in the discovery signal, and the RRC-connected node having detected this field may report the corresponding UE ID and/or the signal strength to the scheduling node through physical layer signaling or higher layer signaling. The UE having received the request through which proximity information received from the peripheral UEs is reported to the scheduling node may form a single cluster (cluster A) in which the corresponding UE is used as the cluster head as shown in FIG. 13, and it may be assumed that path attenuation between UEs contained in this cluster (Cluster A) is equal to or less than predetermined path attenuation. (Alternatively, only UE information having a predetermined path attenuation value or less may be reported.) In this case, information (i.e., proximity information report) reported to the scheduling node through the cluster head may be limited to information of the UE having direct communication intention upon completion of the discovery procedure.

Embodiment 3

If the emergency signal is transmitted through D2D communication under the emergency situation, the WAN UE may transmit data without passing through the corresponding region. In this case, if the WAN UE recognizes the broadcast time point of the emergency signal, information (e.g., previously allocated SPS or periodic CSI reporting, ACK/NACK feedback, etc.) to be transmitted by the WAN UE may be omitted as necessary. If it is impossible for the WAN UE to directly receive the D2D broadcast signal (e.g., if the WAN UE is used as a D2D non-capable UE), the BS may indicate the start of broadcast through the downlink control signal (e.g., this may be an MSG-2 based on RACH). During SPS or CSI reporting, the BS and the UE may stop the SPS or CSI reporting during the D2D broadcast section. In the case of using ACK/NACK functions, the BS may promise the ACK or NACK function in advance, and the WAN UE may not transmit A/N signals. If ACK/NACK repetition is triggered, the ACK or NACK state may be determined, or the ACK or NACK state may be promised according to the number of repeated ACK/NACK signals having been transmitted. In addition, the D2D UE having semi-statically received the resources from among a plurality of D2D capability UEs having received the D2D emergency broadcast message may promise to stop semi-static transmission in advance.

Apparatus According to this Embodiment

Figure 14:
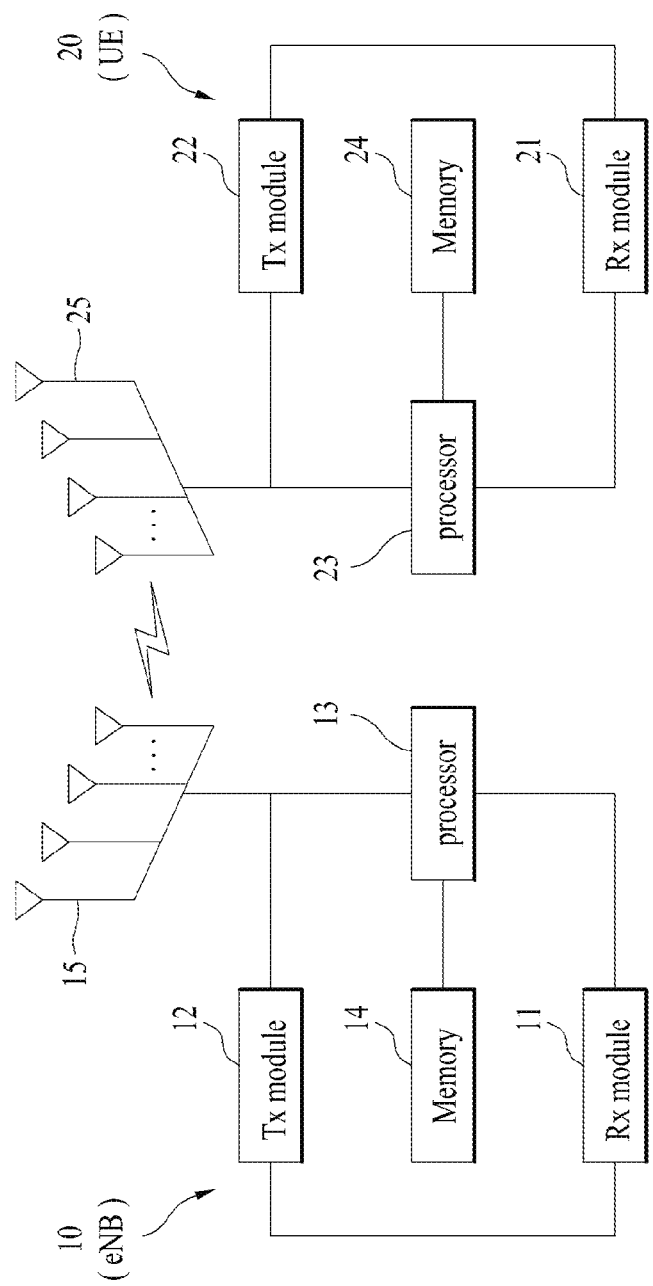
FIG. 14 is a block diagram illustrating a transceiver apparatus applicable to embodiments of the present invention.

FIG. 14 is a block diagram illustrating a transmission point apparatus and a UE device according to embodiments of the present invention.

Referring to FIG. 14, the transmission point apparatus 10 according to the present invention may include a reception (Rx) module 11, a transmission (Tx) module 12, a processor 13, a memory 14, and a plurality of antennas 15. The plurality of antennas 15 indicates a transmission point apparatus for supporting MIMO transmission and reception. The reception (Rx) module 11 may receive a variety of signals, data and information on an uplink starting from the UE. The Tx module 12 may transmit a variety of signals, data and information on a downlink for the UE. The processor 13 may provide overall control to the transmission point apparatus 10.

The processor 13 of the transmission (Tx) point apparatus 10 according to one embodiment of the present invention can process various operations needed for the above-mentioned measurement report, handover, random access, etc.

The processor 13 of the transmission point apparatus 10 processes information received at the transmission point apparatus 10 and transmission information to be transmitted externally. The memory 14 may store the processed information for a predetermined time. The memory 14 may be replaced with a component such as a buffer (not shown).

Referring to FIG. 14, the UE device 20 may include an Rx module 21, a Tx module 22, a processor 23, a memory 24, and a plurality of antennas 25. The plurality of antennas 25 indicates a UE apparatus supporting MIMO transmission and reception. The Rx module 21 may receive downlink signals, data and information from the BS (eNB). The Tx module 22 may transmit uplink signals, data and information to the BS (eNB). The processor 23 may provide overall control to the UE device 20.

The processor 23 of the UE device 20 according to one embodiment of the present invention can process various operations needed for the above-mentioned measurement report, handover, random access, etc.

The processor 23 of the UE device 20 may process information received at the UE apparatus 20 and transmission information to be transmitted externally. The memory 24 may store the processed information for a predetermined time. The memory 24 may be replaced with a component such as a buffer (not shown).

The specific configurations of the transmission point apparatus and the UE device may be implemented such that the various embodiments of the present invention are performed independently or two or more embodiments of the present invention are performed simultaneously. Redundant matters will not be described herein for clarity.

The description of the transmission point apparatus 10 shown in FIG. 14 may be applied to a relay node (RN) acting as a DL transmission entity or UL reception entity without departing from the scope or spirit of the present invention. In addition, the description of the UE device 20 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

What is claimed is:

1. A method for allowing a secondary node device to transmit a signal in a wireless communication system, the method performed by the secondary node device and comprising:
  receiving a scheduling map from one of a scheduling node or a master node;
  performing at least one of scheduling of the secondary node device or transmit (Tx) power control of the secondary node device based on the scheduling map; and
  transmitting a signal based on a result of the scheduling or based on a result of the Tx power control,
  wherein, when the secondary node device transmits each of control information and data in a discontinuous frequency domain within a component carrier (CC), the performing the Tx power control includes:
    coordinating a first maximum Tx power of the control information, and
    coordinating a second maximum Tx power of the data, and
  wherein each of the coordinating the first maximum Tx power and the coordinating the second maximum Tx power are performed based on an interference on a CC adjacent to the CC,
  wherein the coordinating the first maximum Tx power and the coordinating the second maximum Tx power are performed such that a difference between the first maximum Tx power and the second maximum Tx power is equal to or less than a specific value, and
  wherein the specific value is determined in consideration of an interference generated in the data by transmission of the control information.

2. The method according to claim 1, wherein the interference on the CC adjacent to the CC is caused by at least one of an in-band emission, a harmonic or an inter-modulation.

3. The method according to claim 1, wherein the control information comprises Wide Area Network (WAN) signal and the data comprises a Device to Device (D2D) signal.

4. The method according to claim 1, wherein the scheduling map includes at least one of a first region in which interference occurs due to transmission of a primary node or a second region in which the transmission of the primary node is to be guaranteed.

5. The method according to claim 1, wherein the scheduling map includes at least one of:
  information indicating a resource allocation region of a primary node,
  emission information based on a signal transmission of the primary node,
  an identification (ID) of the primary node,
  maximum Tx power information of the secondary node device,
  an ID of the secondary node device, or
  information associated with an application range of the scheduling map.

6. The method according to claim 5, wherein the transmitting of the signal comprises:
  transmitting the signal using a power that is equal to or less than a value of the maximum Tx power information of the secondary node device.

7. The method according to claim 1, wherein:
  the scheduling of the secondary node device is limited either in a first region in which interference occurs due to transmission of a primary node or in a second region in which transmission of the primary node is to be guaranteed.

8. The method according to claim 1, wherein the coordinating the first maximum Tx power and the second maximum Tx power comprises:
  coordinating the maximum Tx power information only when a result of a signal measurement of a primary node is equal to or less than a predetermined threshold value.

9. The method according to claim 1, wherein:
  if a primary node is a Wide Area Network (WAN) UE, the Tx power control is performed using a Reference Signal Receive Power (RSRP), a path attenuation estimation value from the RSRP, or a target emission level.

10. A secondary node device for use in a wireless communication system, comprising:
  a transceiver; and
  a processor operably connected to the transceiver, wherein the processor:
    controls the transceiver to receive a scheduling map from one of a scheduling node or a master node, performs at least one of scheduling of the secondary node device or transmit (Tx) power control of the secondary node device based on the scheduling map, and controls the transceiver to transmit a signal based on a result of the scheduling or based on a result of the Tx power control, wherein, when the secondary node device transmits each of control information and data in a discontinuous frequency domain within a component carrier (CC), the Tx power control includes:
- coordinating a first maximum Tx power of the control information, and
- coordinating a second maximum Tx power of the data, and wherein each of the coordinating the first maximum Tx power and the coordinating the second maximum Tx power are performed based on an interference on a CC adjacent to the CC, wherein the coordinating the first maximum Tx power and the coordinating the second maximum Tx power are performed such that a difference between the first maximum Tx power and the second maximum Tx power is equal to or less than a specific value, and wherein the specific value is determined in consideration of an interference generated in the data by transmission of the control information.

* * * * *